(12) United States Patent  
Bai

(10) Patent No.: US 12,574,904 B2  
(45) Date of Patent: Mar. 10, 2026

(54) ACCESS AND TRANSMISSION METHOD FOR AVOIDING PREAMBLE COLLISION IN MASSIVE ACCESS TECHNOLOGY, AND NETWORK-SIDE DEVICE, TERMINAL AND STORAGE MEDIUM

(71) Applicant: DATANG MOBILE COMMUNICATIONS EQUIPMENT CO., LTD., Beijing (CN)

(72) Inventor: Wei Bai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 329 days.

(21) Appl. No.: 18/270,933

(22) PCT Filed: Jan. 10, 2022

(86) PCT No.: PCT/CN2022/071019  
§ 371 (c)(1),  
(2) Date: Jul. 5, 2023

(87) PCT Pub. No.: WO2022/156554  
PCT Pub. Date: Jul. 28, 2022

(65) Prior Publication Data  
US 2024/0064707 A1 Feb. 22, 2024

(30) Foreign Application Priority Data  
Jan. 20, 2021 (CN) ........................ 202110076836.X

(51) Int. Cl.  
*H04W 72/04* (2023.01)  
*H04L 1/00* (2006.01)  
*H04W 74/0833* (2024.01)

(52) U.S. Cl.  
CPC ........... *H04W 72/04* (2013.01); *H04L 1/0008* (2013.01); *H04W 74/085* (2013.01)

(58) Field of Classification Search  
CPC . H04W 72/04; H04W 74/085; H04W 74/006; H04W 74/0866; H04W 16/28;  
(Continued)

(56) References Cited

U.S. PATENT DOCUMENTS

2007/0206531 A1 9/2007 Pajukoski et al.  
2011/0019694 A1* 1/2011 Kwon ................. H04L 27/2613  
370/474  
(Continued)

FOREIGN PATENT DOCUMENTS

CN 104469966 A 3/2015  
CN 107872884 A 4/2018  
(Continued)

OTHER PUBLICATIONS

LG Electronics, Remaining issues of random access for NR-U, R1-2008042, 3GPP TSG RAN WG1 Meeting #103, Nov. 13, 2020.  
(Continued)

*Primary Examiner* — Rushil P. Sampat  
(74) *Attorney, Agent, or Firm* — Meunier Carlin & Curfman LLC

(57) ABSTRACT

Disclosed are an access and transmission method, and a network-side device, a terminal and a storage medium, which are used for solving the problem in the related art of a collision in preamble parts. In the embodiments of the present application, pseudo-random information is added to preamble parts, and the preamble parts and data parts are sent by using resources configured on a network side, such that the preamble parts of different terminals can be made to be as different as possible by using the pseudo-random information, thereby avoiding the problem of multiple col- (Continued)

lisions being caused due to preamble parts of the terminals being the same.

20 Claims, 6 Drawing Sheets

(58) Field of Classification Search
CPC ............. H04W 72/044; H04W 74/002; H04W 74/004; H04W 74/0833; H04W 52/146; H04W 52/242; H04W 52/246; H04W 52/325; H04W 52/42; H04W 52/50; H04W 72/046; H04W 74/0838; H04L 1/0008; H04L 27/2613; H04L 5/0023; H04L 5/0048; H04L 5/0053; H04L 27/26136; H04B 7/06964; H04B 7/088
See application file for complete search history.

(56) References Cited

U.S. PATENT DOCUMENTS

| | | | | |
|---|---|---|---|---|
| 2014/0086176 | A1* | 3/2014 | Liu | H04W 74/006 370/252 |
| 2014/0348122 | A1* | 11/2014 | Li | H04W 72/04 370/330 |
| 2018/0176947 | A1* | 6/2018 | Yu | H04W 74/006 |
| 2019/0230713 | A1* | 7/2019 | Geng | H04W 72/0453 |
| 2019/0296848 | A1* | 9/2019 | Wang | H04B 10/00 |
| 2019/0373646 | A1 | 12/2019 | Shin et al. | |
| 2020/0029302 | A1 | 1/2020 | Cox et al. | |
| 2020/0068620 | A1 | 2/2020 | Kim et al. | |
| 2020/0169372 | A1 | 5/2020 | Utkovski et al. | |
| 2020/0351853 | A1* | 11/2020 | Xiong | H04W 74/006 |
| 2020/0374921 | A1 | 11/2020 | Li et al. | |
| 2021/0168876 | A1 | 6/2021 | Wu et al. | |
| 2022/0385439 | A1* | 12/2022 | Qian | H04L 27/2605 |

FOREIGN PATENT DOCUMENTS

| | | | |
|---|---|---|---|
| CN | 109041253 | A | 12/2018 |
| CN | 110167103 | A | 8/2019 |
| CN | 110463285 | A | 11/2019 |
| CN | 110831230 | A | 2/2020 |
| CN | 110832942 | A | 2/2020 |
| EP | 2104292 | A1 | 9/2009 |
| JP | 2018510562 | A | 4/2018 |
| WO | 2018054099 | A1 | 3/2018 |
| WO | 2021066602 | A1 | 4/2021 |

OTHER PUBLICATIONS

Huawei, Preamble assignment for DL data arrival, 3GPP TSG RAN WG2 Meeting #63, Aug. 22, 2008.

* cited by examiner

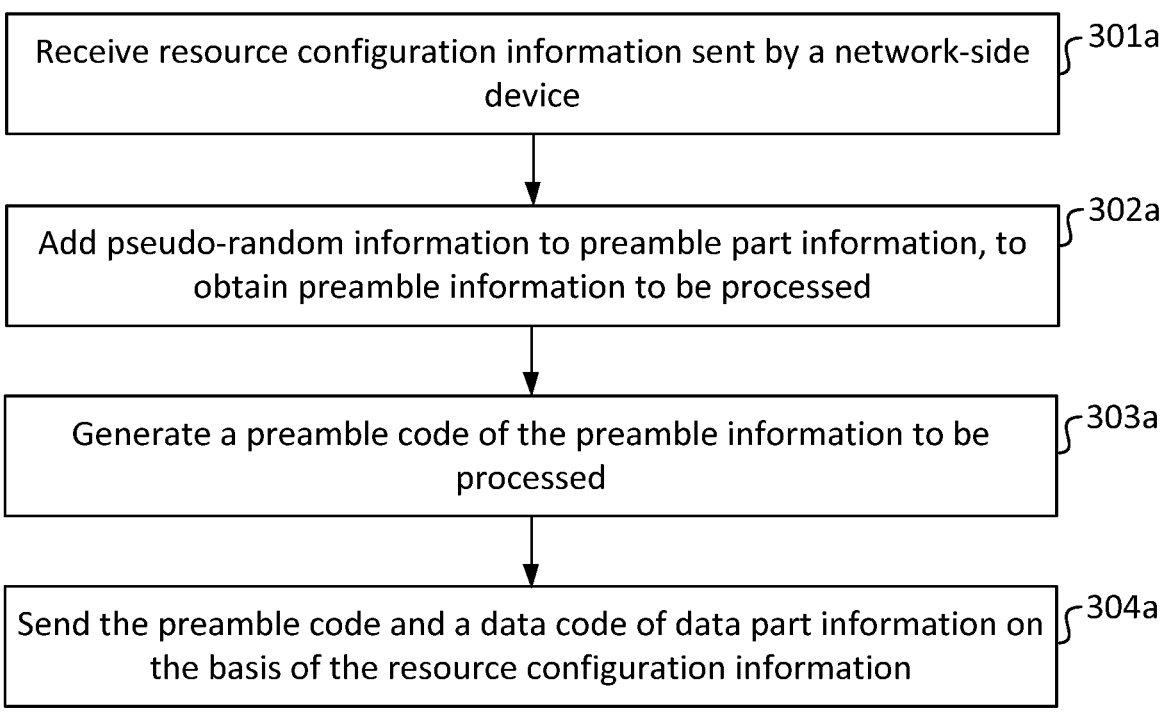

Receive resource configuration information sent by a network-side device ⌐301a

Add pseudo-random information to preamble part information, to obtain preamble information to be processed ⌐302a Generate a preamble code of the preamble information to be processed ⌐303a Send the preamble code and a data code of data part information on the basis of the resource configuration information ⌐304a

Fig. 3A

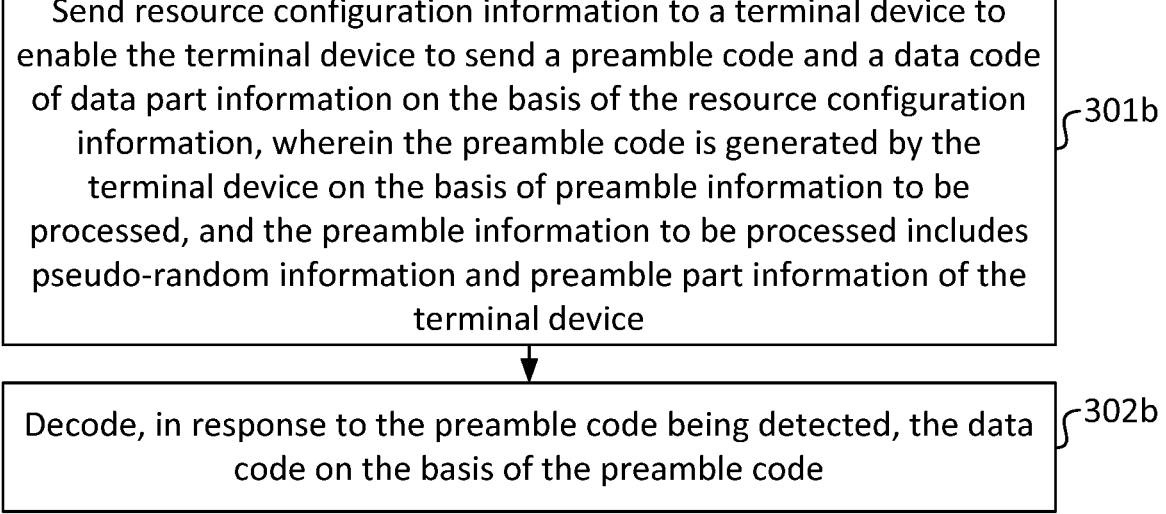

Send resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device ⌐301b Decode, in response to the preamble code being detected, the data code on the basis of the preamble code ⌐302b

Fig. 3B

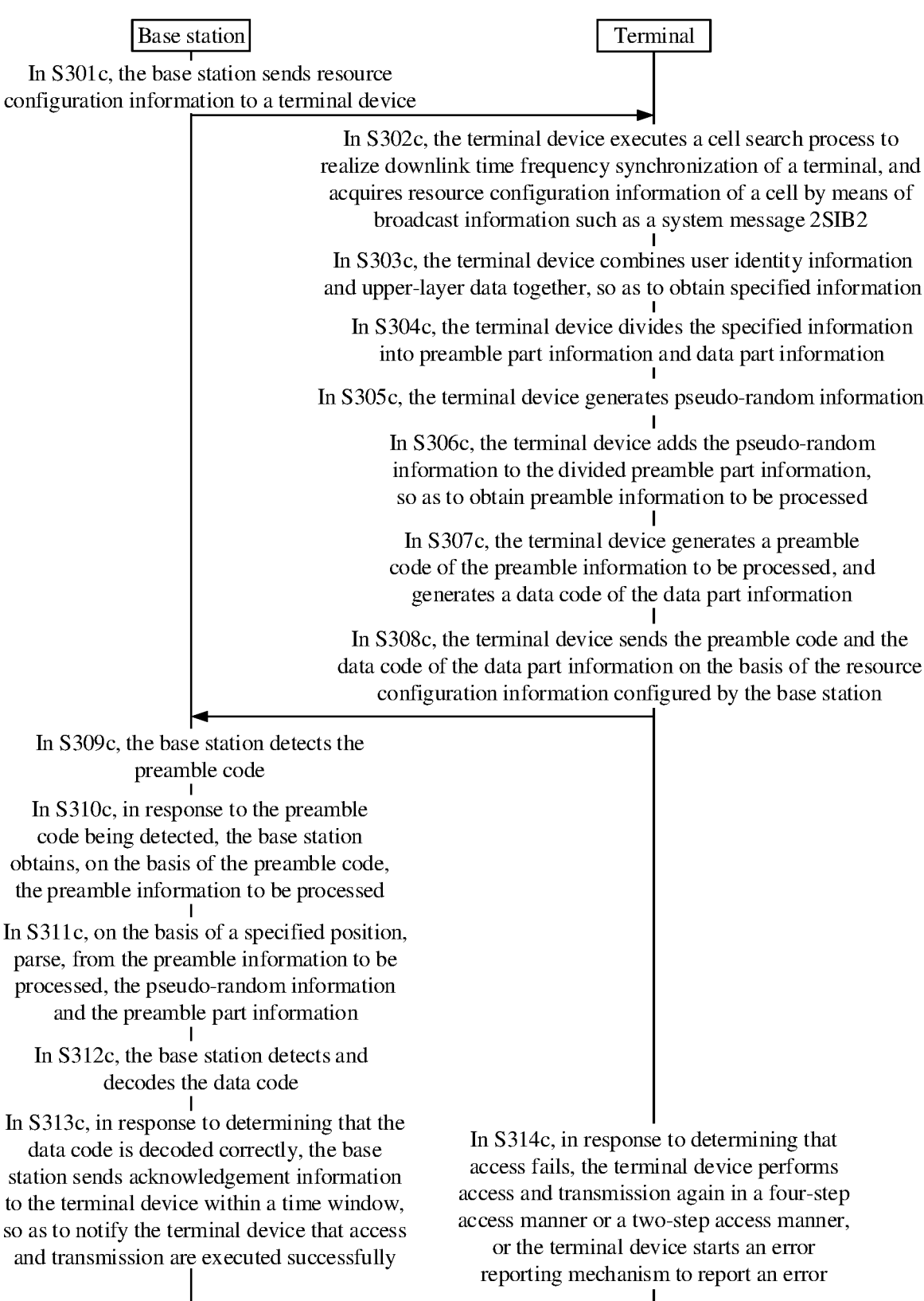

Base station

Terminal

In S301c, the base station sends resource configuration information to a terminal device In S302c, the terminal device executes a cell search process to realize downlink time frequency synchronization of a terminal, and acquires resource configuration information of a cell by means of broadcast information such as a system message 2SIB2

In S303c, the terminal device combines user identity information and upper-layer data together, so as to obtain specified information In S304c, the terminal device divides the specified information into preamble part information and data part information In S305c, the terminal device generates pseudo-random information In S306c, the terminal device adds the pseudo-random information to the divided preamble part information, so as to obtain preamble information to be processed In S307c, the terminal device generates a preamble code of the preamble information to be processed, and generates a data code of the data part information In S308c, the terminal device sends the preamble code and the data code of the data part information on the basis of the resource configuration information configured by the base station In S309c, the base station detects the preamble code In S310c, in response to the preamble code being detected, the base station obtains, on the basis of the preamble code, the preamble information to be processed In S311c, on the basis of a specified position, parse, from the preamble information to be processed, the pseudo-random information and the preamble part information In S312c, the base station detects and decodes the data code In S313c, in response to determining that the data code is decoded correctly, the base station sends acknowledgement information to the terminal device within a time window, so as to notify the terminal device that access and transmission are executed successfully In S314c, in response to determining that access fails, the terminal device performs access and transmission again in a four-step access manner or a two-step access manner, or the terminal device starts an error reporting mechanism to report an error

Network-side device

Sending module 901

Decoding module 902

ACCESS AND TRANSMISSION METHOD FOR AVOIDING PREAMBLE COLLISION IN MASSIVE ACCESS TECHNOLOGY, AND NETWORK-SIDE DEVICE, TERMINAL AND STORAGE MEDIUM

CROSS REFERENCE TO RELATED APPLICATIONS

The present application is a National Stage of International Application No. PCT/CN2022/071019 filed Jan. 10, 2022, which claims priority to Chinese patent application No. 202110076836.X filed on Jan. 20, 2021 to China Patent Office, and entitled "ACCESS AND TRANSMISSION METHOD, AND NETWORK-SIDE DEVICE, TERMINAL AND STORAGE MEDIUM", the entire content of which is incorporated herein by reference.

TECHNICAL FIELD

The present application relates to the technical field of communications, in particular to an access and transmission method, a network-side device, a terminal and a storage medium.

BACKGROUND

In a fifth generation new radio (NR) system, a terminal device needs to adopt a random access manner to access a network and transmit data.

An access and transmission manner is to first select a preamble from a preamble resource pool, and then send out a random access request on the basis of the selected preamble for a subsequent random access and data transmission flow.

However, the above access and transmission process needs to wait for a confirmation of a base station, when access fails or data transmission fails once, a preamble needs to be reselected for access and data transmission, although it can avoid a collision of different terminal resources by avoiding selection of the same preamble as much as possible, a time delay is long, and more terminals cannot be supported to perform access and data transmission at the same time.

In order to reduce the time delay and support more terminals to perform access and data transmission at the same time, a massive access technology is proposed in the related art. Information (including identity information and data information) is required to be divided into two parts by the terminals in massive access, including a preamble part and a data part, the preamble part is sent to a network side after sparse mapping, and the latter is mapped to a plurality of resource blocks to be sent out after encoded.

A difference between massive access and a traditional multiple access technology is that because identity information of users is placed in data for encoded transmission, the massive access does not need to know the identity information of the users during detection. A massive number of users share a channel to transmit the encoded data without a need to identify the users, and thus the network side may support a condition of an infinite total number of users as an encoded length increases.

However, the inventor's study found that in the massive access technology, collisions may occur on resource blocks with more than two terminals performing sending, resulting in access and transmission failures. Therefore, how to solve the collision problem is yet to be solved.

SUMMARY

The present application provides an access and transmission method, a network-side device, a terminal and a storage medium, which are used for solving a problem that preamble parts are prone to a collision in the related art.

In a first aspect, the present application provides an access and transmission method, including: receiving resource configuration information sent by a network-side device; adding pseudo-random information to preamble part information, to obtain preamble information to be processed; generating a preamble code of the preamble information to be processed; and sending the preamble code and a data code of data part information on the basis of the resource configuration information.

In some embodiments, the pseudo-random information includes a pseudo-random number, and the method further includes: generating the pseudo-random number by adopting device information of a terminal device.

In some embodiments, the device information is identity information or state information of the terminal device, and the generating the pseudo-random number by adopting device information of a terminal device, includes: taking the identity information or the state information of the terminal device as an initial value of a random number generator, to obtain the pseudo-random number.

In some embodiments, the resource configuration information includes a sending period and resource position information, and the sending the preamble code and a data code of data part information on the basis of the resource configuration information, includes: sending the preamble code and the data code of the data part information periodically on the basis of the sending period and the resource position information; wherein the pseudo-random information adopted by different sending periods is determined respectively.

In some embodiments, the method further includes: receiving an upper limit on the number of times of sending the preamble code indicated by the network-side device.

In some embodiments, the resource configuration information includes a preamble code resource position and resource positions of K resource blocks, wherein K is a positive integer, and the method further includes: encoding the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identifying the resource block corresponding to the bit as carrying a data encoding result, and when the bit takes a second value, identifying the resource block corresponding to the bit as not carrying the data encoding result.

The sending the preamble code and a data code of data part information on the basis of the resource configuration information, includes: sending the preamble code on the basis of the preamble code resource position; and mapping the data code to the K resource blocks on the basis of the mapping relationship encoding result.

In a second aspect, the present application further provides an access and transmission method, including: sending resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device; and decoding, in response to the preamble code being detected, the data code on the basis of the preamble code.

In some embodiments, the resource configuration information includes a preamble code resource position and resource positions of K resource blocks, and the decoding, in response to the preamble code being detected, the data code on the basis of the preamble code, includes: obtaining the pseudo-random information and the preamble part information on the basis of the preamble code; encoding the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identifying the resource block corresponding to the bit as carrying a data encoding result, and when the bit takes a second value, identifying the resource block corresponding to the bit as not carrying the data encoding result; and detecting the data code and performing decoding on the resource block carrying the data encoding result.

In some embodiments, the pseudo-random information is located at a specified position of the preamble information to be processed, and the obtaining the pseudo-random information and the preamble part information on the basis of the preamble code, includes: performing correlation detection on the preamble code by adopting a preamble, to obtain the preamble information to be processed; and parsing, on the basis of the specified position, the pseudo-random information and the preamble part information from the preamble information to be processed.

In a third aspect, the present application provides a terminal device, including a processor, a memory and a transceiver; the memory, configured to store a computer program; the transceiver, configured to receive and send data under control of the processor; and the processor, configured to read the computer program in the memory and execute the following operations: receiving resource configuration information sent by a network-side device through the transceiver; adding pseudo-random information to preamble part information, to obtain preamble information to be processed; generating a preamble code of the preamble information to be processed; and sending the preamble code and a data code of data part information on the basis of the resource configuration information.

In some embodiments, the pseudo-random information includes a pseudo-random number, and the processor is further configured to generate the pseudo-random number by adopting device information of the terminal device.

In some embodiments, the device information is identity information or state information of the terminal device, and the processor, when executing the generating the pseudo-random number by adopting device information of a terminal device, is configured to: take the identity information or the state information of the terminal device as an initial value of a random number generator, to obtain the pseudo-random number.

In some embodiments, the resource configuration information includes a sending period and resource position information, and the processor, when executing the sending the preamble code and a data code of data part information on the basis of the resource configuration information, is configured to: send the preamble code and the data code of the data part information periodically on the basis of the sending period and the resource position information; wherein the pseudo-random information adopted by different sending periods is determined respectively.

In some embodiments, the processor is further configured to: receive an upper limit on the number of times of sending the preamble code indicated by the network-side device through the transceiver.

In some embodiments, the resource configuration information includes a preamble code resource position and resource positions of K resource blocks, wherein K is a positive integer, and the processor is further configured to: encode the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identify the resource block corresponding to the bit as carrying a data encoding result, and when the bit takes a second value, identify the resource block corresponding to the bit as not carrying the data encoding result.

The processor, when executing the sending the preamble code and a data code of data part information on the basis of the resource configuration information, is configured for: sending the preamble code on the basis of the preamble code resource position; and mapping the data code to the K resource blocks on the basis of the mapping relationship encoding result.

In a fourth aspect, the present application further provides a network-side device, including a processor, a memory and a transceiver; the memory is configured to store a computer program; the transceiver is configured to receive and send data under control of the processor; and the processor is configured to read the computer program in the memory and execute the following operations: controlling the transceiver to send resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device; and decoding, in response to the preamble code being detected, the data code on the basis of the preamble code.

In some embodiments, the resource configuration information includes a preamble code resource position and resource positions of K resource blocks, and executing, by the processor, the decoding, in response to the preamble code being detected, the data code on the basis of the preamble code, includes: obtaining the pseudo-random information and the preamble part information on the basis of the preamble code; encoding the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identifying the resource block corresponding to the bit as carrying a data encoding result, and when the bit takes a second value, identifying the resource block corresponding to the bit as not carrying the data encoding result; and detecting the data code and performing decoding on the resource block carrying the data encoding result.

In some embodiments, the pseudo-random information is located at a specified position of the preamble information to be processed, and executing, by the processor, the obtaining the pseudo-random information and the preamble part information on the basis of the preamble code, includes: performing correlation detection on the preamble code by adopting a preamble, to obtain the preamble information to be processed; and parsing, on the basis of the specified position, the pseudo-random information and the preamble part information from the preamble information to be processed.

In a fifth aspect, the present application further provides a terminal device, including: a receiving module, configured to receive resource configuration information sent by a network-side device; a random information processing module, configured to add pseudo-random information to preamble part information, to obtain preamble information to be processed; an encoding module, configured to generate a preamble code of the preamble information to be processed; and a sending module, configured to send the preamble code and a data code of data part information on the basis of the resource configuration information.

In some embodiments, the pseudo-random information includes a pseudo-random number, and the terminal device further includes: a random number generating module, configured to generate the pseudo-random number by adopting device information of the terminal device.

In some embodiments, the device information is identity information or state information of the terminal device, and the random number generating module is further configured to: take the identity information or the state information of the terminal device as an initial value of a random number generator, to obtain the pseudo-random number.

In some embodiments, the resource configuration information includes a sending period and resource position information, and the sending module is further configured to: send the preamble code and the data code of the data part information periodically on the basis of the sending period and the resource position information; wherein the pseudo-random information adopted by different sending periods is determined respectively.

In some embodiments, the receiving module is further configured to receive an upper limit on the number of times of sending the preamble code indicated by the network-side device.

In some embodiments, the resource configuration information includes a preamble code resource position and resource positions of K resource blocks, wherein K is a positive integer, and the terminal device further includes: a mapping module, configured to encode the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identify the resource block corresponding to the bit as carrying a data encoding result, and when the bit takes a second value, identify the resource block corresponding to the bit as not carrying the data encoding result.

The receiving module is further configured to: send the preamble code on the basis of the preamble code resource position; and map the data code to the K resource blocks on the basis of the mapping relationship encoding result.

In a sixth aspect, an embodiment of the present application further provides a network-side device, including: a sending module, configured to send resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device; and a decoding module, configured to decode, in response to the preamble code being detected, the data code on the basis of the preamble code.

In some embodiments, the resource configuration information includes a preamble code resource position and resource positions of K resource blocks, and the decoding module is further configured to: obtain the pseudo-random information and the preamble part information on the basis of the preamble code; encode the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identify the resource block corresponding to the bit as carrying a data encoding result, and when the bit takes a second value, identify the resource block corresponding to the bit as not carrying the data encoding result; and detect the data code and perform decoding on the resource block carrying the data encoding result.

In some embodiments, the pseudo-random information is located at a specified position of the preamble information to be processed, and the decoding module is further configured to: perform correlation detection on the preamble code by adopting a preamble, to obtain the preamble information to be processed; and parse, on the basis of the specified position, the pseudo-random information and the preamble part information from the preamble information to be processed.

In a seventh aspect, an embodiment of the present application further provides a computer storable medium, storing a computer program thereon, and the program, when executed by a processor, implements operations of any method in the first aspect.

In addition, a technical effect brought by any one implementation in the second aspect to the seventh aspect may refer to technical effects brought by different implementations in the first aspect, which is not repeated here.

In the embodiments of the present application, the pseudo-random information is added to preamble parts, and the preamble parts and data parts are sent by means of resources configured on a network side, such that the preamble parts of different terminals can be made to be as different as possible by means of the pseudo-random information, thereby avoiding a problem of a plurality of collisions caused due to the preamble parts of the terminals being the same.

These or other aspects of the present application will be clearer and more easily understood in descriptions of the following embodiments.

BRIEF DESCRIPTION OF FIGURES

In order to explain technical solutions in embodiments of the present application more clearly, the following will briefly introduce the accompanying drawings that need to be used in the description of the embodiments. Apparently, the accompanying drawings in the following description are only some embodiments of the present application, and for those of ordinary skill in the art, on the premise of no creative labor, other accompanying drawings may be obtained according to these drawings.

FIG. 3A is a schematic flow diagram of an access and transmission method provided by an embodiment of the present application.

FIG. 3B is a schematic flow diagram of an access and transmission method provided by an embodiment of the present application.

FIG. 3C is another schematic flow diagram of an access and transmission method provided by an embodiment of the present application.

DETAILED DESCRIPTION

Figure 1:
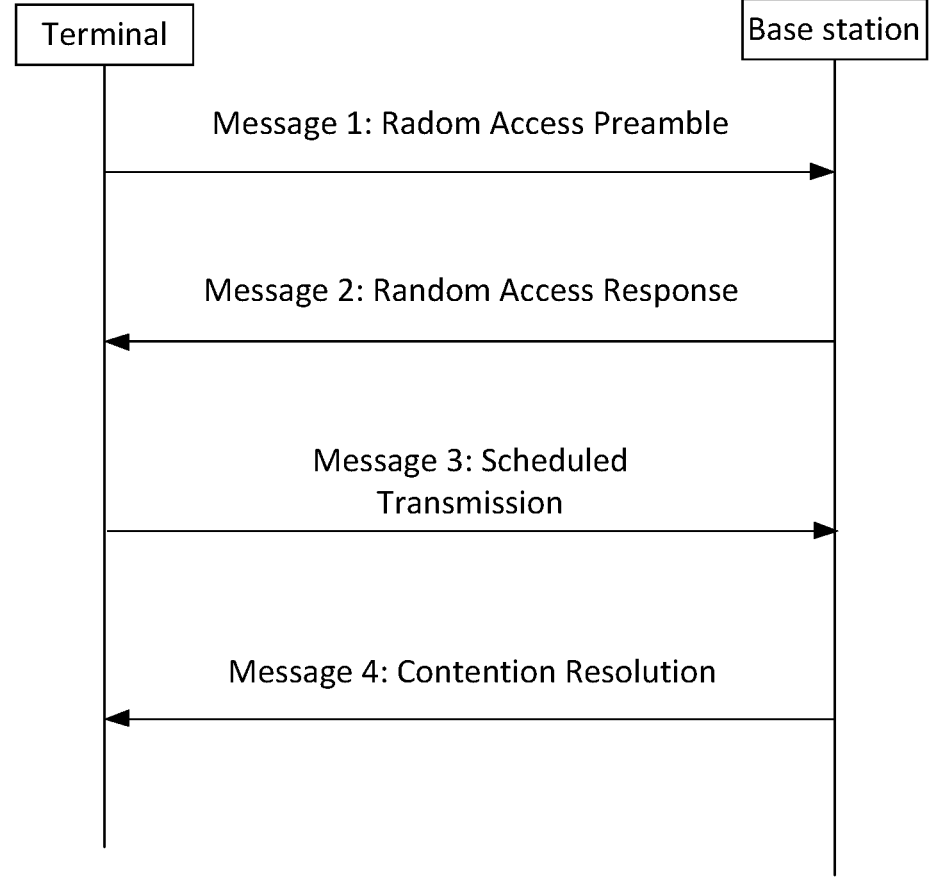
FIG. 1 is a schematic flow diagram of a four-step access manner provided by an embodiment of the present application.

Part of terms in embodiments of the present application is explained below so as to be understood by those of skill in the art.

(1) In the embodiments of the present application, nouns "network" and "system" are often alternately used, but those of skill in the art may understand their meanings.

(2) The term "a plurality of" in the embodiments of the present application means two or more, and other quantifiers are similar to it.

(3) "And/or" describes an association relationship of associated objects, which means that there may be three kinds of relationships, for example, A and/or B can mean that there are three kinds of situations: A alone, A and B at the same time, and B alone. The character "/" universally indicates that front and back associated objects are in an "or" relationship.

Technical solutions provided by the embodiments of the present application can be applied to a variety of systems, especially 6G systems. For example, applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. Both terminal devices and network-side devices are included in these variety of systems. The systems may further include core network parts, such as evolved packet systems (EPSs) and 5G systems (5GSs).

The terminal device involved in the embodiments of the present application may be a device that provides voice and/or data connectivity to a user, a handheld device with a wireless connection function, or other processing devices connected to a wireless modem, etc. In different systems, the names of the terminal devices may also be different, for example, in 5G systems, the terminal devices may be called user equipment (UE). A wireless terminal device may communicate with one or more core networks (CNs) via a radio access network (RAN) and may be a mobile terminal device such as a mobile phone (or a "cellular" phone) and a computer with a mobile terminal device, for example, a portable, pocket-sized, handheld, computer-built-in, or vehicle-mounted mobile apparatus that exchanges language and/or data with the RAN, and for example, a personal communication service (PCS) phone, a cordless phone, a session initiated protocol (SIP) phone, a wireless local loop (WLL) station, a personal digital assistant (PDA), and other devices. The wireless terminal device may also be called a system, a subscriber unit, a subscriber station, a mobile station, a mobile, a remote station, an access point, a remote terminal, an access terminal, a user terminal, a user agent, and a user device, which is not limited in the embodiments of the present application.

The network-side device involved in the embodiments of the present application may be a base station, which may include a plurality of cells that provide services to a terminal. According to different specific application scenarios, the base station may also be called an access point, or may be a device that communicates with a wireless terminal device through one or more sectors on an air interface in an access network, or other names. The network-side device may be configured to interchange a received air frame with an Internet protocol (IP) packet, acting as a router between the wireless terminal device and the rest of the access network, the rest of the access network may include an Internet protocol (IP) communication network. The network-side device may also coordinate management of attributes of the air interface. For example, the network-side device involved in the embodiments of the present application may be a network-side device (a base transceiver station (BTS)) in a global system for mobile communications (GSM) or code division multiple access (CDMA), may also be a network-side device (NodeB) in wide-band code division multiple access (WCDMA), may further be an evolutional network-side device (an evolutional Node B, eNB or e-NodeB) in a long term evolution (LTE) system, and a 5G base station (gNB) in a 5G network architecture (a next generation system), and may also be a home evolved base station (a home evolved Node B, HeNB), a relay node, a home base station (a femto), a pico base station (a pico), etc., which is not limited in the embodiments of the present application. In some network structures, each network-side device may include a centralized unit (CU) node and a distributed unit (DU) node, and a centralized unit and a distributed unit may also be geographically separated.

The network architecture and business scenarios described in the embodiments of the present application are to illustrate the technical solutions of the embodiments of the present application more clearly, and do not constitute a limitation on the technical solutions provided by the embodiments of the present application. It is known to those of ordinary skill in the art that with the evolution of the network architecture and the emergence of new business scenarios, the technical solutions provided by the embodiments of the present application are suitable for similar technical problems.

In order to make the objects, technical solutions and advantages of the present application clearer, the present application will be further described in detail in combination with the accompanying drawings below. Apparently, the described embodiments are only part of the embodiments of the present application, not all of them. Based on the embodiments in the present application, all other embodiments obtained by those of ordinary skill in the art without making creative work fall within the protection scope of the present application.

First, for ease of understanding, the following analyzes and illustrates situations of the related art, and it should be understood that the analysis of the related art below is also part of the embodiments of the present application.

It should be understood that access and transmission involved in the embodiments of the present application refer to the access and data transmission of a terminal device.

In the related art, three access and transmission solutions may be broadly included, including a four-step access manner, a two-step access manner and massive access.

1) The Four-Step Access Manner

In the LTE/NR four-step random access channel (RACH) manner, a main purpose is to achieve uplink time synchronization and terminal identity determination. Random access and data transmission are included. The data transmission starts after an RACH has accessed successfully. The four-step RACH is shown in FIG. 1: four messages (Message 1, Message 2, Message 3 and Message 4) are included. In an RACH flow, a terminal sends a preamble randomly from a preamble resource pool, and a base station continues to interact with the terminal through a detected preamble ID to complete a terminal identity determination process. The interaction flow includes the following.

Message 1, random access preamble: the terminal sends the preamble to inform the base station of existence of a random access request and requests the base station to estimate time advanced (TA).

Assuming that there are totally 64 preambles in each cell, the preambles used for contention-based random access (CBRA) may be further divided into two groups, and the base station informs the terminal of resources allowed to transmit the preambles, the two preamble groups of the terminal, a size threshold of Message 3, power configuration and other information through SIB2 (system information blocks, system Message 2). The terminal selects a suitable preamble (preamble ID) in the two preamble groups according to a possible size of Message 3, pathloss and other information, selects a suitable random access channel occasion (RACH occasion (RO)) to send out Message 1, and calculates a radio network temporary identity for random access (RA-RNTI) according to the RO during sending. In addition, Message 1 carries 1-bit information to indicate the size of Message 3 to the base station.

In Message 1, for communication between the base station and the terminal, the preamble ID and the RA-RNTI are started as identity information of the terminal.

Message 2, random access response: after sending the preamble, the terminal will monitor a physical downlink control channel (PDCCH) and a physical downlink shared channel (PDSCH) within a random access time window (an RA response window (an RAR time window)), the PDCCH and the PDSCH contain RA-RNTI information, and the RAR information includes preamble ID, TA, TC-RNTI used by Message 3, resources, etc. If no RAR of the base station is received within the RAR time window, the terminal considers that the random access process fails and will retransmit Message 1.

For communication between the base station and the terminal, the preamble ID and the RA-RNTI are used as the identity information of the terminal, and meanwhile the TC-RNTI is started as the identity information of the terminal.

Message 3, scheduled transmission: the terminal will use the TC-RNTI to send Message 3 on scheduled resources. Message 3 mainly includes high-level configuration information, such as a terminal international mobile subscriber identity (IMSI), a radio resource control (RRC) connection request, a tracking information update, etc.

Message 3 is transmitted on a physical uplink shared channel (PUSCH), a hybrid automatic repeat request (HARQ) is used, and when there is a conflict in Message 3 of the terminal that prevents the base station from sending Message 4, the terminal restarts random access after reaching a maximum number of HARQ retransmissions.

For communication between the base station and the terminal, the TC-RNTI is used as the identity information of the terminal, and meanwhile, the terminal IMSI is obtained as unique identity information of the terminal.

Message 4, contention resolution: after sending Message 3, the terminal starts a timer and uses the TC-RNTI all the time to monitor the PDCCH and the PDSCH until the timer times out. The PDSCH contains Message 3 of the terminal, and if the terminal determines that Message 3 is consistent with Message 3 in a local cache after decoding the PDSCH correctly, acknowledge character (ACK) information is sent to upgrade the TC-RNTI to a C-RNTI. If the timer times out, the terminal discards the TC-RNTI and considers the random access as a failure.

For communication between the base station and the terminal, the TC-RNTI is used as the identity information of the terminal, and after the terminal IMSI is confirmed, the TC-RNTI is upgraded to the C-RNTI as the unique identity information of the terminal.

For data transmission, when the above four-step flow is completed between the terminal and the base station, the uplink synchronization information TA and the unique identity information C-RNTI of the terminal are obtained, and the random access is successful. Next, the terminal can use the C-RANI for data transmission.

The Two-Step Access Manner

In a random access phase, a 2-step random access (2-step RACH) manner is used for sending in order to support more active users (without waiting for a process of a preamble to be released) and to reduce a time delay. In sending of a Message A (MSG-A), the terminal sends the preamble and uplink data directly instead of going through the random access process before uplink data sending as in the traditional four-step RACH. Problems of the two-step RACH are asynchronous sending of the uplink data and an increased probability of collisions between terminals (because a length of preamble+data becomes larger). To solve the problem of asynchronous sending, two methods may be used: empirical TA values and increasing a cyclic prefix (CP). To solve the problem of the high collision probability, a fall back method may be used, i.e., if a base station can perform decoding correctly, it responds to the terminal according to the two-step RACH, and if the base station cannot decode the data correctly, then it falls back to the traditional four-step RACH and performs an RAR only for the preamble. To support more active users, a demodulation reference signal (DMRS)

in a data part may be used to extend the preamble and obtain a larger number of effective preambles.

Figure 2:
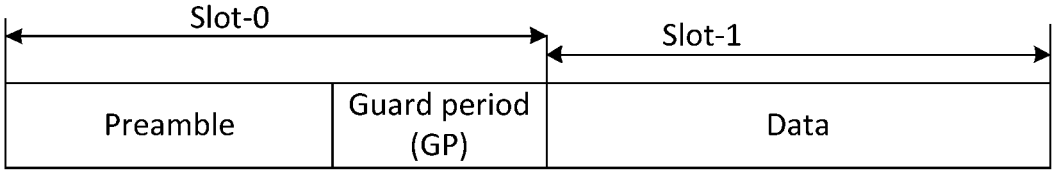
FIG. 2 is a schematic diagram of a two-step access manner provided by an embodiment of the present application.

A channel structure of the two-step RACH is shown in FIG. 2, two slots (Slot-0, and Slot-1) are occupied for one time of sending, corresponding to the preambles and the data respectively, and a guard period is reserved in between so as to reduce an impact of other terminals' preambles on target UE data. A design of the preambles may follow a preamble design of the NR, the preambles are used for a TA estimation as well as a channel estimation at the same time, and the data slots may no longer send a guide frequency.

Massive Access

In the massive access and its compressed sensing solution, each active terminal divides information (identity information+data) into two parts, i.e., a preamble part and a data part. The former performs sparse mapping to select a column from an encoding matrix A to send it out, and the latter performs spatially coupled low density parity check code (SC-LDPC) encoding, while using a column number of the former as a number of an interleaver to interleave an output of the latter to obtain a sub-block encoded output, encode the sub-block encoded output to obtain a V-length sub-block mapping code word, divide N resources into V sub-blocks, and map the sub-block encoded output according to the sub-block mapping code word, i.e., if a $t^{th}$ bit of the sub-block mapping code word is 1, the sub-block encoded output is sent on the $t^{th}$ resource sub-block, otherwise no data is sent. As a result, a massive number of terminals may be supported to access the network at the same time, and the access time delay may also be reduced. However, two or more terminals with the same preamble part bits will select the same column in A, and a collision will occur, i.e., the preamble parts collide. If the preamble parts collide, because the next preamble in the massive access is still determined by a part of the data, the preamble parts are prone to a collision on a resource sub-block with more than two terminals for sending.

In order to solve the problem of the collision of the preamble parts, an embodiment of the present application provides an access and transmission method. An invention concept of the present application may be summarized as follows: pseudo-random information is added to preamble parts, and the preamble parts and data parts are sent by means of resources configured by a network side, such that the preamble parts of different terminals can be made to be as different as possible by means of the pseudo-random information, thereby avoiding the problem of a plurality of collisions being caused due to preamble parts of the terminals being the same.

The access and transmission method provided by the embodiments of the present application is first illustrated by using a terminal device as an example.

It is assumed that the terminal device executes a cell search to realize downlink time frequency synchronization, and acquires random transmission configuration information of a message by means of broadcast information such as SIB2, and the random transmission configuration information includes resource configuration information, a sending manner, etc. The resource configuration information includes a sending period and resource position information, such as a sending resource position encoded by a preamble part. Based on this, if a combination of identity information and data information of the terminal device as a whole constitutes specified information, the specified information is divided into preamble part information and data part information. Then, as shown in FIG. 3A, the terminal device may execute the following operations.

In S301*a*, the resource configuration information sent by a network-side device is received.

In S302*a*, pseudo-random information is added to the preamble part information, to obtain preamble information to be processed.

In some embodiments, the pseudo-random information may be added to first n bits of the preamble part information obtained by the division, or to last n bits, or to a middle position certainly. In addition, random information may occupy either continuous positions or non-continuous positions, as long as it is possible to agree or negotiate which positions to occupy as specified positions.

During implementation, the pseudo-random information may include a pseudo-random number, which may be generated by adopting a random number generator. In order to facilitate different pseudo-random numbers generated by different terminal devices, during implementation, the terminal devices' own device information may be adopted to generate their own pseudo-random numbers.

Of course, in another embodiment, the device information used for generating the pseudo-random number may be implemented as identity information (which may be equivalent to the identity information used for dividing the preamble part information and the data part information as described above) or state information. For example, the IMSI, an MAC address, a physical position, etc., as initialization values for an m sequence, are an m sequence generated by periodic sending of each preamble part code, i.e., an initial value of the random number generator.

Due to differences between the identity information or the state information of different terminal devices, it can further ensure that the pseudo-random numbers generated by different terminal devices are different, thus ensuring that the preamble information to be processed of different terminal devices is as different as possible, to reduce the collision of the terminal devices due to the same preamble part information.

In S303*a*, a preamble code of the preamble information to be processed is generated.

For example, the preamble code may be generated by the sparse mapping or the encoding manner described above.

In addition, the data part information also corresponds to the data code. During implementation, the data code of the data part information may be obtained by encoding after the data part information is obtained by the division. The encoding of the preamble part information and the data part information may be performed independently.

Of course, the encoding of the data part information may also depend on the preamble code of the preamble part information to be processed to be obtained. For example, the data part information is first encoded by adopting a preset encoding manner (e.g., LC-LDPC) to obtain the data code. In addition, the data code may be pre-processed by scrambling, interleaving, modulation, frequency spreading, pre-encoding and other operations to obtain the data code to be finally sent.

Then, in S304*a*, the preamble code and the data code of the data part information are sent on the basis of the resource configuration information.

For example, as described above, the resource configuration information includes a sending period and resource position information, and to ensure a success rate of access and transmission, the preamble code and the data code of the data part information may be sent periodically on the basis of the sending period and the resource position information. On this basis, the pseudo-random information adopted by different sending periods is determined respectively in order to further avoid the plurality of collisions. For example, in the first sending period, the terminal device adopts its own device information to generate a pseudo-random number 1 to add it to the preamble part information, to obtain preamble information 1 to be processed composed of (the preamble part information+the pseudo-random number 1), and in the second sending period, the terminal device adopts its own device information to generate a pseudo-random number 2 to add it to the preamble part information, to obtain preamble information 2 to be processed composed of (the preamble part information+the pseudo-random number 2), so that for the same terminal device, the preamble information to be processed adopted in different sending periods is as different as possible, which will avoid the plurality of collisions of the same terminal device.

During implementation, the resource configuration information includes a preamble code resource position and resource positions of K resource blocks, wherein K is a positive integer, in order to realize mapping of the data code to different resource blocks for sending, in the embodiment of the present application, the preamble information to be processed or the preamble part information is encoded, to obtain a mapping relationship encoding result, the mapping relationship encoding result includes K bits, the K bits are in one-to-one correspondence to the K resource blocks, for any one bit, when the bit takes a first value, the resource block corresponding to the bit is identified as carrying a data encoding result, and when the bit takes a second value, the resource block corresponding to the bit is identified as not carrying the data encoding result. As a result, the preamble code may be sent on the basis of the preamble code resource position, and the data code is mapped to the K resource blocks for sending on the basis of the mapping relationship encoding result. The data code can realize maximum K times of repeated transmission.

Of course, in another embodiment, in order to avoid the same terminal device from sending the preamble code and the data code for an unlimited number of times and occupying too many resources, the random transmission configuration information sent by the network-side device may further include an indication of an upper limit on the number of times of sending the preamble code. As a result, the terminal device may appropriately stop the sending of the preamble code and the data code according to the indication. For example, for each time of sending, the total number of times of sending of this access and transmission is determined, and when the upper limit is reached, the sending of the preamble code and the data code is stopped. During implementation here, the terminal also detects and receives the acknowledge character (ACK) information sent by the base station synchronously within the time window, and may also terminate the sending of the preamble code and the data code if it is determined that the ACK information is received.

Accordingly, based on the same inventive concept, an embodiment of the present application further provides an access and transmission method applied to a network-side device (e.g., a base station), as shown in FIG. 3B, including the following steps.

In S301*b*, resource configuration information is sent to a terminal device.

Thus, the terminal device may send a preamble code and a data code of data part information on the basis of the resource configuration information. The resource configuration information has been illustrated above and will not be repeated herein.

The following embodiments illustrate important steps for the network-side device.

For example, while the terminal device sends the preamble code and the data code, the network-side device performs detection of the preamble code, and in S302*b*, if the preamble code is detected, the data code is decoded on the basis of the preamble code.

The resource configuration information includes a preamble code resource position and resource positions of K resource blocks, then pseudo-random information and preamble part information may be obtained on the basis of the preamble code; and for example, it can be implemented to perform correlation detection on the preamble code by adopting a preamble, to obtain preamble information to be processed, and then parse, on the basis of a specified position, the pseudo-random information and the preamble part information from the preamble information to be processed. For example, the pseudo-random information may be added to first n bits of the preamble part information obtained by division, or to last n bits, or a middle position certainly. In addition, random information may occupy either continuous positions or non-continuous positions, as long as it is possible to agree or negotiate which positions to occupy as specified positions.

After the preamble part information is parsed, as described previously, the preamble information to be processed or the preamble part information may be encoded, to obtain a mapping relationship encoding result, similarly as described previously, the mapping relationship encoding result includes K bits, the K bits are in one-to-one correspondence to the K resource blocks, for any one bit, when the bit takes a first value, the resource block corresponding to the bit is identified as carrying a data encoding result, and when the bit takes a second value, the resource block corresponding to the bit is identified as not carrying the data encoding result; and then, the data code is detected and decoding is performed on the resource block carrying the data encoding result.

The network-side device, if decoding can be performed successfully, may send acknowledge character (ACK) information to the terminal device within a time window, otherwise it may not perform any processing until an upper limit of sending the preamble code is reached.

To facilitate systematic understanding of the solution provided by an embodiment of the present application, as shown in FIG. 3C, a schematic flow diagram of interaction between a terminal device and a base station in an access and transmission method provided by the embodiment of the present application, includes the following steps.

In S301*c*, the base station sends resource configuration information to the terminal device.

It may be implemented that the base station sends a synchronous channel and a broadcast channel, and sends random transmission configuration information of a cell, and the random transmission configuration information includes resource configuration information, sending manner information, etc. of random transmission. The base station may notify the random transmission configuration information to each terminal by means of SIB2. As described above, the resource configuration information includes a preamble part code resource position, a sending period, etc. The sending manner information is available for the terminal to select an appropriate sending manner to send information, such as a modulation manner, a pre-encoding manner, etc.

In S302*c*, the terminal device executes a cell search process to realize downlink time frequency synchronization of the terminal, and acquires the resource configuration information of the cell by means of broadcast information such as SIB2.

As the random transmission configuration information described above, the resource configuration information includes the resource configuration information, the sending manner information, etc. of random transmission, and further includes the preamble part code resource position, resource positions of resource blocks, the sending period, etc.

In S303c, the terminal device combines user identity information and upper-layer data together, to obtain specified information.

One or a combination of user identity information such as an IMSI, an IP address, an MAC address, or geographic position information of the terminal device is used as a user's ID.

In S304c, the terminal device divides the specified information into preamble part information and data part information.

In order to increase a length of the preamble part information to avoid collision sending, additional information may be added to the preamble part information. In the embodiment of the present application, in order to avoid a collision of different terminals with the same preamble part information, different terminals may generate pseudo-random information with terminal devices in S305c and add it to their respective terminal devices, so that the preamble part information of different terminals may be further differentiated and thus avoid the collision, and to avoid ambiguity, the preamble part information added with the pseudo-random information will be called the preamble information to be processed in the later text.

In an embodiment, the pseudo-random information may be implemented as a pseudo-random number. During implementation, the number of bits of the pseudo-random number may be determined according to actual needs, and may be 1 bit or a plurality of bits.

In some embodiments, information used for generating the pseudo-random number may be device information of the terminal device. In this way, different terminals can collect their own device information to generate different pseudo-random numbers as far as possible, in order to facilitate differential processing of the preamble part information of different terminals.

Further, the identity information or the state information of the terminal devices may be adopted to distinguish the pseudo-random numbers of different terminals to the maximum extent. During implementation, the identity information or the state information of the terminal devices may be used as initial values of a random number generator, to obtain the pseudo-random numbers, and thus in S306c, the terminal devices add the pseudo-random information to the divided preamble part information, to obtain preamble information to be processed described above.

It should be noted that during implementation, an order of execution of generation of the pseudo-random information (i.e., S305c) and division of information to be sent (i.e., S304c) is not limited, i.e., S305c may be executed first and then S304c is executed, or S304c may be executed first and then S305c is executed, or S304c and S305c may be executed simultaneously.

In S307c, the terminal device generates a preamble code of the preamble information to be processed, and generates a data code of the data part information.

During implementation, a coefficient mapping manner and an arbitrary encoding manner may be adopted to process the preamble information to be processed to obtain the preamble code.

During implementation, the data code of the data part information may be obtained by encoding after the data part information is obtained by the division.

Of course, the encoding of the data part information may also depend on the preamble code of the preamble part information to be processed to be obtained. For example, the data part information is first encoded by adopting a preset encoding manner (e.g., LC-LDPC) to obtain the data code. In addition, the data code may be pre-processed by scrambling, interleaving, modulation, frequency spreading, pre-encoding and other operations to obtain the data code to be finally sent.

Then, in S308c, the terminal device sends the preamble code and the data code of the data part information on the basis of the resource configuration information configured by the base station.

Figure 4:
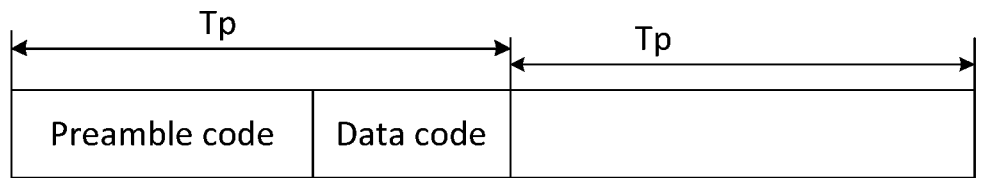
FIG. 4 is a schematic diagram of periodically transmitting a preamble code and a data code provided by an embodiment of the present application.

For example, if the resource configuration information includes a sending period and resource position information, to improve a success rate of access and transmission, the preamble code and the data code may be sent periodically on basis of the sending period and the resource position information until an ACK fed back from the base station is received to determine success of access and transmission. As shown in FIG. 4, assuming the sending period as Tp, sending of one time of the preamble code and at least one time of the data code are completed in one sending period. The reason why a plurality of times of data codes may be sent in one sending period is that the plurality of resource blocks may be used in one sending period. The data codes may be mapped on each resource block, so that each resource block may carry the data code at most once to send it out.

In order to avoid collisions, in the embodiments of the present application, there is no necessary connection between the preamble codes of different sending periods, and different sending periods generate pseudo-random information respectively for generating the preamble codes. For example, the divided preamble part information is A, and the data part information is B. Then, in the first sending period, the identity information of the terminal device is adopted to generate a pseudo-random number A1, then A1+A generates the preamble code for the first sending period, and B generates the data code for the first sending period. For the second sending period, the identity information of the terminal device is again adopted to generate a pseudo-random number A2, A2+A generates the preamble code for the second sending period, and B generates the data code for the second sending period. In the same way, for the preamble codes for different sending periods, the pseudo-random numbers are generated separately, and further the preamble codes are generated. As a result, the possibility of collisions may be further reduced.

In some embodiments, in order to avoid wasting system resources by consuming too much signaling overhead or being continuously tried to access by the same terminal, an upper limit of the number of times of sending the preamble code may be set in the embodiments of the present application. The upper limit may be carried by the base station in the resource configuration information to be sent to the terminal device. The terminal device may count the number of times of sending the preamble code according to the upper limit, when the upper limit is reached, it may determine that the access fails and does not send the preamble code and the data code repeatedly, and then it may enter into the four-step access manner or the two-step access manner to complete the access and data transmission. Of course, in another embodiment, an error reporting mechanism may also be adopted to report an error when the number of times of sending the preamble code reaches the upper limit, so that the network-side device may analyze the reason for the access failure.

In another embodiment, in order to accurately and reasonably configure resources to avoid collisions, in the embodiment of the present application, the resource configuration information includes the preamble code resource position and resource positions of K resource blocks, and K is a positive integer. During implementation, the preamble code is sent on the basis of the preamble code resource position, and the data code is mapped to the resource blocks for sending.

During implementation, in order to map the data code to the resource blocks, the preamble information to be processed or the preamble part information may be encoded, to obtain a mapping relationship encoding result, the mapping relationship encoding result includes K bits, the K bits are in one-to-one correspondence to the K resource blocks, for any one bit, when the bit takes a first value (such as 1), the resource block corresponding to the bit is identified as carrying a data encoding result, and when the bit takes a second value (such as 0), the resource block corresponding to the bit is identified as not carrying the data encoding result. After the mapping relationship is obtained, the data code may be mapped to the K resource blocks to complete the sending of the data code on the basis of the mapping relationship encoding result. As a result, a mapping manner may be obtained simply and flexibly on the basis of an encoding manner of the preamble information to be processed or the preamble part information, thus facilitating transmission of the data code.

During implementation, when high-level data (i.e., data information) has a large amount of information, the data information may be partitioned. Each block and identity information are combined together to divide the preamble part information and the data part information, and then the transmission of each block of information is completed according to a processing flow of the embodiment of the present application, so that it can be compatible with high-level data with different lengths and realize the transmission of high-level data information with different lengths.

Figure 5:
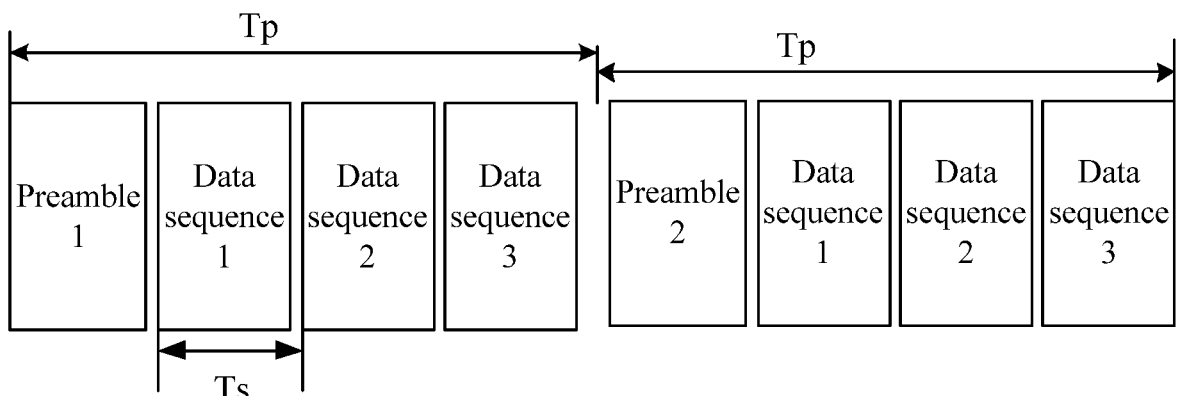
FIG. 5 is yet another schematic diagram of periodically transmitting a preamble code and a data code provided by an embodiment of the present application.

For example, as shown in FIG. 5, a schematic diagram of a sending manner of the preamble code and the data code in two periods is shown. In FIG. 5, each sending period shows a condition of 3 resource blocks, and an interval period for each resource block is Ts. As a result, up to three times (i.e., K times) of repeated transmission of the data code may be realized per sending period.

In the embodiments of the present application, the preamble may adopt a preamble in the NR or may be different from the preamble in the NR.

In addition, the resources occupied by the data code may be different in each sending period; and for example, K bits are obtained by encoding the preamble information to be processed or the preamble part information code, bit 1 means transmission on the corresponding resource, and bit 0 means no transmission on the corresponding resource.

In S309c, the base station detects the preamble code.

For example, the base station adopts the preamble and the resource used for carrying the preamble code for correlation detection to detect the presence of the preamble code. If a receiver knows all the preambles, the detection of the preamble code is realized by conjugate multiplication and summation with a received signal one by one.

In S310c, if the preamble code is detected, the base station obtains, on the basis of the preamble code, the preamble information to be processed.

For example, the preamble code is decoded to obtain the preamble information to be processed. Since the preamble information to be processed contains the pseudo-random information and the divided preamble part information, the base station can obtain the pseudo-random information and the preamble part information through detection of the preamble code.

During implementation, a position relationship between the pseudo-random information and the preamble part information may be determined in an agreement or interaction manner, for example, first N bits (N is a positive integer) or last N bits in the preamble information to be processed are the pseudo-random information, thus the position of the pseudo-random information may be agreed to be the specified position, and then in S311c, on the basis of the specified position, the pseudo-random information and the preamble part information may be parsed from the preamble information to be processed.

On the basis of the preamble information to be processed or the preamble part information, the mapping relationship encoding result described above may be obtained to obtain which of the K resource blocks carries the data code. In S312c, the base station detects and decodes the data code.

In S313c, if it is determined that the data code is decoded correctly, the base station can send acknowledge character information to the terminal device within a time window, to notify the terminal device that access and transmission are executed successfully.

Otherwise, if the data code is not decoded correctly, the base station may not perform any operation. In addition, the base station may not perform any processing if the decoding of the data code is not correct after the upper limit of the number of times of sending the preamble code is reached. In this way, if the terminal device does not detect the acknowledge character information of the base station within the time window, it is determined that access and transmission have not been successfully executed. In S314c, if it is determined that access fails, the terminal device can perform access and transmission again in a four-step access manner or a two-step access manner. Or the terminal device starts an error reporting mechanism to report an error.

It may be determined that access fails when the number of times of sending the preamble code reaches the upper limit, or it may be determined that access fails when the acknowledge character information of the base station is not detected within the time window.

In summary, in the embodiments of the present application, the pseudo-random information is added to preamble parts by the network-side device, and the preamble parts and data parts are sent by means of resources configured by a network side, such that the preamble parts of different terminals can be made to be as different as possible by means of the pseudo-random information, thereby avoiding a problem of a plurality of collisions being caused due to the preamble parts of the terminals being the same.

In addition, in the embodiments of the present application, the user-initiated access and transmission process does not require coordination by the base station, but only requires some synchronization and broadcast information, and acknowledge character information of successful reception by the base station, so the number of users accommodated is only related to the number of configured access and transmission resources.

The terminal device makes a judgment on this time of access and sending within the time window. If the ACK information is received within the time window, the time window is automatically closed, and of the current access and transmission is successful; and if the ACK information is not received within the time window, of the current access and transmission fails, and a traditional access and trans- mission flow is started, or the error reporting mechanism is started.

Figure 6:
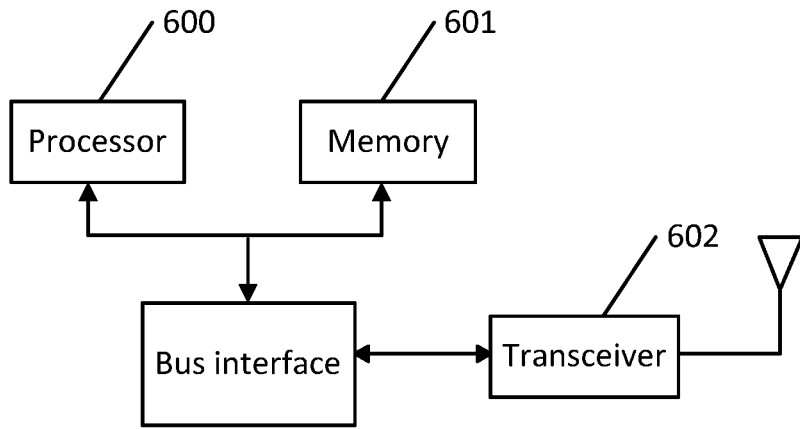
FIG. 6 is a schematic structural diagram of a terminal device provided by an embodiment of the present application.

Based on the same inventive concept, as shown in FIG. 6, an embodiment of the present application provides a termi- nal device, including a processor 600, a memory 601 and a transceiver 602.

The processor 600 is responsible for managing a bus architecture and general processing, and the memory 601 may store data used when the processor 600 executes operations. The transceiver 602 is configured to receive and send data under control of the processor 600.

The bus architecture may include interconnected buses and bridges of any number, which are specifically linked together through various circuits of one or more processors represented by the processor 600 and various circuits of memories represented by the memory 601. The bus archi- tecture may also link various other circuits such as periph- eral devices, voltage regulators, and power management circuits, which are well known in the field, and therefore are not further described herein. A bus interface provides an interface. The processor 600 is responsible for managing the bus architecture and general processing, and the memory 601 may store data used when the processor 600 executes the operations.

A flow disclosed in the embodiment of the present appli- cation may be applied to the processor 600 or implemented by the processor 600. During an implementation process, all steps of a signal processing flow may be completed by an integrated logic circuit of hardware or an instruction in the form of software in the processor 600. The processor 600 may be a general-purpose processor, a digital signal proces- sor, an application specific integrated circuit, a field pro- grammable gate array or other programmable logic devices, a discrete gate or a transistor logic device, or a discrete hardware component, and may implement or execute meth- ods, steps and logic block diagrams disclosed in the embodi- ments of the present application. The general-purpose pro- cessor may be a microprocessor, or any conventional processor, etc. The steps of the method disclosed in con- junction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a program- mable read-only memory, an electrically erasable program- mable memory, and a register. The storage medium is located in the memory 601, and the processor 600 reads information in the memory 601, and completes the steps of the flow of the access and transmission method in combi- nation with its hardware.

Specifically, the processor 600 is configured to read a program in the memory 601 and execute: receiving resource configuration information sent by a network-side device through the transceiver; adding pseudo-random information to preamble part information, to obtain preamble information to be processed; generating a preamble code of the preamble information to be processed; and sending the preamble code and a data code of data part information on the basis of the resource configuration information.

In some embodiments, the pseudo-random information includes a pseudo-random number, and the processor is further configured to generate the pseudo-random number by adopting device information of the terminal device.

In some embodiments, the device information is identity information or state information of the terminal device, and the processor, when executing the generating the pseudo- random number by adopting device information of a termi- nal device, is configured to: use the identity information or the state information of the terminal device as an initial value of a random number generator, to obtain the pseudo- random number.

In some embodiments, the resource configuration infor- mation includes a sending period and resource position information, and the processor, when executing the sending the preamble code and a data code of data part information on the basis of the resource configuration information, is configured to: send the preamble code and the data code of the data part information periodically on the basis of the sending period and the resource position information; wherein the pseudo-random information adopted by differ- ent sending periods is determined respectively.

In some embodiments, the processor is further configured to: receive an upper limit on the number of times of sending the preamble code indicated by the network-side device through the transceiver.

In some embodiments, the resource configuration infor- mation includes a preamble code resource position and resource positions of K resource blocks, wherein K is a positive integer, and the processor is further configured: encode the preamble information to be processed or the preamble part information, to obtain a mapping relationship encoding result, the mapping relationship encoding result including K bits, the K bits being in one-to-one correspon- dence to the K resource blocks, for any one bit, when the bit takes a first value, identify the resource block corresponding to the bit as carrying a data encoding result, and when the bit takes a second value, identify the resource block correspond- ing to the bit as not carrying the data encoding result.

The executing, by the processor, the sending the preamble code and a data code of data part information on the basis of the resource configuration information, is used for: sending the preamble code on the basis of the preamble code resource position; and mapping the data code to the K resource blocks on the basis of the mapping relationship encoding result.

Figure 7:
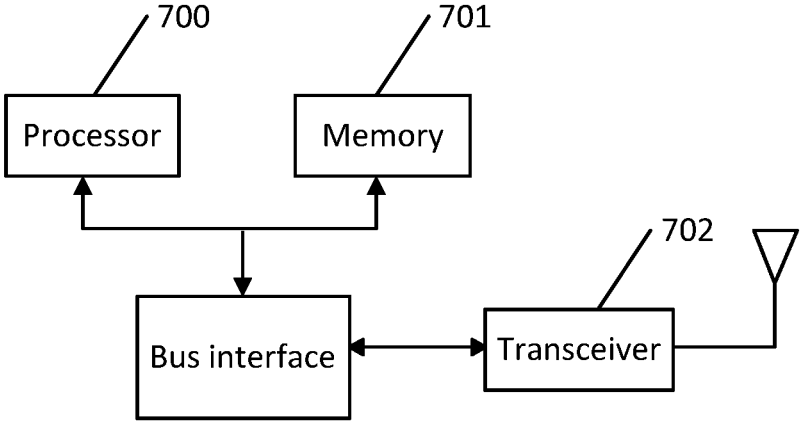
FIG. 7 is a schematic structural diagram of a network-side device provided by an embodiment of the present application.

As shown in FIG. 7, a network side device provided by an embodiment of the present application includes a processor 700, a memory 701 and a transceiver 702.

The processor 700 is responsible for managing a bus architecture and general processing, and the memory 701 may store data used when the processor 700 executes operations. The transceiver 702 is configured to receive and send data under the control of the processor 700.

The bus architecture may include interconnected buses and bridges of any number, which are specifically linked together through various circuits of one or more processors represented by the processor 700 and various circuits of memories represented by the memory 701. The bus archi- tecture may also link various other circuits such as periph- eral devices, voltage regulators, and power management circuits, which are well known in the art, and therefore are not further described herein. A bus interface provides an interface. The processor 700 is responsible for managing the bus architecture and general processing, and the memory 701 may store data used when the processor 700 executes the operations.

A process disclosed in the embodiment of the present application may be applied to the processor 700 or implemented by the processor 700. During an implementation process, all steps of a signal processing flow may be completed by an integrated logic circuit of hardware or an instruction in the form of software in the processor 700. The processor 700 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 701, and the processor 700 reads information in the memory 701, and completes steps of the processing flow of the access and transmission in combination with its hardware.

Specifically, the processor 700 is configured to read a program in the memory 701 and execute: controlling the transceiver to send resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device; and decoding, if the preamble code is detected, the data code on the basis of the preamble code.

In some embodiments, the resource configuration information includes a preamble code resource position and resource positions of K resource blocks, and executing, by the processor, the decoding, if the preamble code is detected, the data code on the basis of the preamble code, includes: obtaining the pseudo-random information and the preamble part information on the basis of the preamble code; encoding the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identifying the resource block corresponding to the bit as carrying a data encoding result, and when the bit takes a second value, identifying the resource block corresponding to the bit as not carrying the data encoding result; and detecting the data code and performing decoding on the resource block carrying the data encoding result.

In some embodiments, the pseudo-random information is located at a specified position of the preamble information to be processed, and executing, by the processor, the obtaining the pseudo-random information and the preamble part information on the basis of the preamble code, includes: performing correlation detection on the preamble code by adopting a preamble, to obtain the preamble information to be processed; and parsing, on the basis of the specified position, the pseudo-random information and the preamble part information from the preamble information to be processed.

Figure 8:
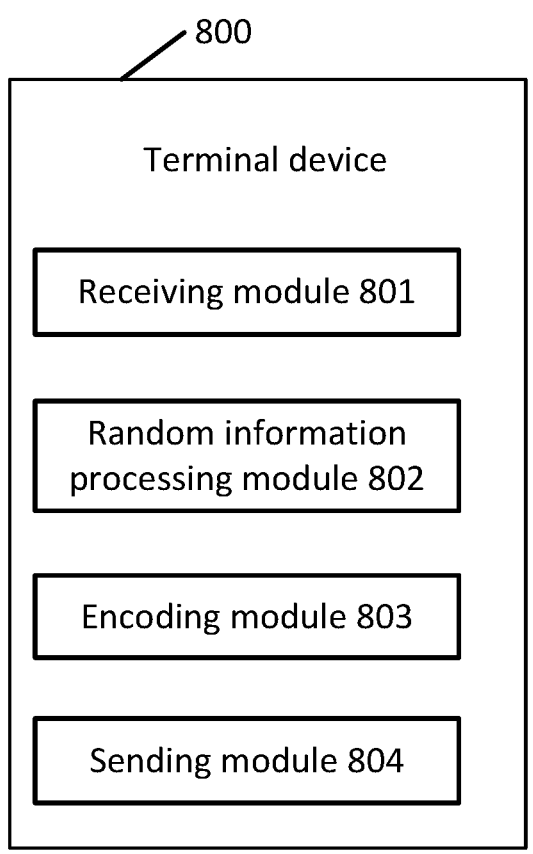
FIG. 8 is another schematic structural diagram of a terminal device provided by an embodiment of the present application.

As shown in FIG. 8, which is a schematic structural diagram of a terminal device provided by an embodiment of the present application, the terminal device 800 includes: a receiving module 801, configured to receive resource configuration information sent by a network-side device; a random information processing module 802, configured to add pseudo-random information to preamble part information, to obtain preamble information to be processed; an encoding module 803, configured to generate a preamble code of the preamble information to be processed; and a sending module 804, configured to send the preamble code and a data code of data part information on the basis of the resource configuration information.

In some embodiments, the pseudo-random information includes a pseudo-random number, and the terminal device further includes: a random number generating module, configured to generate the pseudo-random number by adopting device information of the terminal device.

In some embodiments, the device information is identity information or state information of the terminal device, and the random number generating module is specifically configured to: use the identity information or the state information of the terminal device as an initial value of a random number generator, to obtain the pseudo-random number.

In some embodiments, the resource configuration information includes a sending period and resource position information, and the sending module is specifically configured to: send the preamble code and the data code of the data part information periodically on the basis of the sending period and the resource position information; wherein the pseudo-random information adopted by different sending periods is determined respectively.

In some embodiments, the receiving module is further configured to receive an upper limit on the number of times of sending the preamble code indicated by the network-side device.

In some embodiments, the resource configuration information includes a preamble code resource position and resource positions of K resource blocks, wherein K is a positive integer, and the terminal device further includes: a mapping module, configured to encode the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identify the resource block corresponding to the bit as carrying a data encoding result, and when the bit takes a second value, identify the resource block corresponding to the bit as not carrying the data encoding result.

The sending module is specifically configured to: send the preamble code on the basis of the preamble code resource position; and map the data code to the K resource blocks on the basis of the mapping relationship encoding result.

Figure 9:
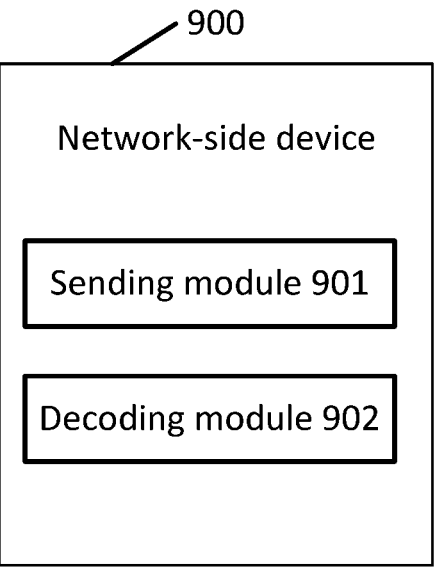
FIG. 9 is another schematic structural diagram of a network-side device provided by an embodiment of the present application.

As shown in FIG. 9, which is a schematic structural diagram of a network-side device provided by an embodiment of the present application, the network-side device 900 includes: a sending module 901, configured to send resource configuration information to a terminal device to enable the terminal device to send a preamble code and a data code of data part information on the basis of the resource configuration information, wherein the preamble code is generated by the terminal device on the basis of preamble information to be processed, and the preamble information to be processed includes pseudo-random information and preamble part information of the terminal device; and a decoding module 902, configured to decode, if the preamble code is detected, the data code on the basis of the preamble code.

In some embodiments, the resource configuration information includes a preamble code resource position and resource positions of K resource blocks, and the decoding module is specifically configured to: obtain the pseudo-random information and the preamble part information on the basis of the preamble code; encode the preamble information to be processed or the preamble part information, to obtain a mapping relationship encoding result, the mapping relationship encoding result including K bits, the K bits being in one-to-one correspondence to the K resource blocks, for any one bit, when the bit takes a first value, identify the resource block corresponding to the bit as carrying a data encoding result, and when the bit takes a second value, identify the resource block corresponding to the bit as not carrying the data encoding result; and detect the data code and perform decoding on the resource block carrying the data encoding result.

In some embodiments, the pseudo-random information is located at a specified position of the preamble information to be processed, and the decoding module is specifically configured to: perform correlation detection on the preamble code by adopting a preamble, to obtain the preamble information to be processed; and parse, on the basis of the specified position, the pseudo-random information and the preamble part information from the preamble information to be processed.

A computer readable storage medium stores a computer program thereon, and the program, when executed by a processor, implements steps of the methods described in FIG. 3A-FIG. 3C above.

The present application is described above with reference to block diagrams and/or flow diagrams of methods, apparatuses (systems) and/or computer program products according to the embodiments of the present application. It should be understood that a block of the block diagrams and/or flow diagrams and a combination of blocks of the block diagrams and/or the flow diagrams may be implemented by computer program instructions. These computer program instructions may be provided for a processor of a general-purpose computer and a special-purpose computer and/or other programmable data processing apparatuses to produce a machine, so that instructions executed by the processor of the computer and/or other programmable data processing apparatuses create a method for implementing a function/action specified in blocks of the block diagrams and/or flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with an instruction execution system, apparatus, or device.

Apparently, those of skill in the art can make various modifications and variations to the present application without departing from the spirit and scope of the present application. In this way, under the condition that these modifications and variations of the present application fall within the scope of the claims of the present application and their equivalent technologies, the present application is also intended to include these modifications and variations.

What is claimed is:

1. An access and transmission method, comprising:
receiving resource configuration information sent by a network-side device;
adding pseudo-random information to preamble part information, to obtain preamble information to be processed;
generating a preamble code of the preamble information to be processed; and
sending the preamble code and a data code of data part information on a basis of the resource configuration information.

2. The method according to claim 1, wherein the pseudo-random information comprises a pseudo-random number, and the method further comprises:
generating the pseudo-random number by adopting device information of a terminal device.

3. The method according to claim 2, wherein the device information is identity information or state information of the terminal device, and the generating the pseudo-random number by adopting the device information of the terminal device comprises:
taking the identity information or the state information of the terminal device as an initial value of a random number generator, to obtain the pseudo-random number.

4. The method according to claim 1, wherein the resource configuration information comprises a sending period and resource position information, and the sending the preamble code and the data code of the data part information on the basis of the resource configuration information comprises:
sending the preamble code and the data code of the data part information periodically on a basis of the sending period and the resource position information; wherein the pseudo-random information adopted by different sending periods is determined respectively, and the pseudo-random information is generated by adopting device information of the terminal device.

5. The method according to claim 1, further comprising:
receiving an upper limit on a quantity of times of sending the preamble code indicated by the network-side device.

6. The method according to claim 1, wherein the resource configuration information comprises a preamble code resource position and resource positions of K resource blocks, wherein K is a positive integer, and the method further comprises:
encoding the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, a resource block corresponding to the bit is identified as carrying a data encoding result, and when the bit takes a second value, the resource block corresponding to the bit is identified as not carrying a data encoding result;

and wherein the sending the preamble code and the data code of the data part information on the basis of the resource configuration information comprises:

sending the preamble code on a basis of the preamble code resource position; and mapping the data code to the K resource blocks on a basis of the mapping relationship encoding result.

7. An access and transmission method, comprising:

sending resource configuration information to a terminal device, wherein the resource configuration information is used by the terminal device to send a preamble code and a data code of data part information, wherein the preamble code is generated by the terminal device on a basis of preamble information to be processed, and the preamble information to be processed comprises pseudo-random information and preamble part information of the terminal device; and decoding, in response to the preamble code being detected, the data code on a basis of the preamble code.

8. The method according to claim 7, wherein the resource configuration information comprises a preamble code resource position and resource positions of K resource blocks, and the decoding, in response to the preamble code being detected, the data code on the basis of the preamble code comprises:

obtaining the pseudo-random information and the preamble part information on the basis of the preamble code;

encoding the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, a resource block corresponding to the bit is identified as carrying a data encoding result, and when the bit takes a second value, the resource block corresponding to the bit is identified as not carrying a data encoding result; and detecting the data code and performing decoding on the resource block carrying the data encoding result.

9. The method according to claim 8, wherein the pseudo-random information is located at a specified position of the preamble information to be processed, and the obtaining the pseudo-random information and the preamble part information on the basis of the preamble code comprises:

performing correlation detection on the preamble code by adopting a preamble, to obtain the preamble information to be processed; and parsing, on a basis of the specified position, the pseudo-random information and the preamble part information from the preamble information to be processed.

10. A terminal device, comprising: a processor, a memory and a transceiver; wherein the memory is configured to store a computer program;

the transceiver is configured to receive and send data under control of the processor; and the processor is configured to read the computer program in the memory to:

receive resource configuration information sent by a network-side device through the transceiver;

add pseudo-random information to preamble part information, to obtain preamble information to be processed;

generate a preamble code of the preamble information to be processed; and send the preamble code and a data code of data part information on a basis of the resource configuration information.

11. The terminal device according to claim 10, wherein the pseudo-random information comprises a pseudo-random number, and the processor is further configured to generate the pseudo-random number by adopting device information of the terminal device.

12. The terminal device according to claim 11, wherein the device information is identity information or state information of the terminal device, and the processor, when executing the generating the pseudo-random number by adopting the device information of the terminal device, is specifically configured to:

take the identity information or the state information of the terminal device as an initial value of a random number generator, to obtain the pseudo-random number.

13. The terminal device according to claim 10, wherein the resource configuration information comprises a sending period and resource position information, and the processor, when executing the sending the preamble code and the data code of the data part information on the basis of the resource configuration information, is specifically configured to:

send the preamble code and the data code of the data part information periodically on a basis of the sending period and the resource position information; wherein the pseudo-random information adopted by different sending periods is determined respectively, and the pseudo-random information is generated by adopting device information of the terminal device.

14. The terminal device according to claim 10, wherein the processor is further configured to:

receive an upper limit on a quantity of times of sending the preamble code indicated by the network-side device through the transceiver.

15. The terminal device according to claim 10, wherein the resource configuration information comprises a preamble code resource position and resource positions of K resource blocks, wherein K is a positive integer, and the processor is further configured to:

encode the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, a resource block corresponding to the bit is identified as carrying a data encoding result, and when the bit takes a second value, the resource block corresponding to the bit is identified as not carrying a data encoding result;

wherein the processor, when executing the sending the preamble code and the data code of the data part information on the basis of the resource configuration information, is specifically configured to:

send the preamble code on a basis of the preamble code resource position; and map the data code to the K resource blocks on a basis of the mapping relationship encoding result.

16. A network-side device, comprising: a processor, memory and a transceiver; wherein the memory is configured to store a computer program;

the transceiver is configured to receive and send data under control of the processor; and the processor is configured to read the computer program in the memory and execute the method of claim 7.

17. The network-side device according to claim 16, wherein the resource configuration information comprises a preamble code resource position and resource positions of K resource blocks, and the processor, when executing the decoding, in response to the preamble code being detected, the data code on the basis of the preamble code, is specifically configured to:

obtain the pseudo-random information and the preamble part information on the basis of the preamble code;

encode the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, the resource block corresponding to the bit is identified as carrying a data encoding result, and when the bit takes a second value, the resource block corresponding to the bit is identified as not carrying a data encoding result; and detect the data code and perform decoding on the resource block carrying the data encoding result.

18. The network-side device according to claim 17, wherein the pseudo-random information is located at a specified position of the preamble information to be processed, and the processor, when executing the obtaining the pseudo-random information and the preamble part information on the basis of the preamble code, is specifically configured to:

perform correlation detection on the preamble code by adopting a preamble, to obtain the preamble information to be processed; and parse, on a basis of the specified position, the pseudo-random information and the preamble part information from the preamble information to be processed.

19. The method according to claim 2, wherein the resource configuration information comprises a preamble code resource position and resource positions of K resource blocks, wherein K is a positive integer, and the method further comprises:

encoding the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, a resource block corresponding to the bit is identified as carrying a data encoding result, and when the bit takes a second value, the resource block corresponding to the bit is identified as not carrying a data encoding result;

and wherein the sending the preamble code and the data code of the data part information on the basis of the resource configuration information comprises:

sending the preamble code on a basis of the preamble code resource position; and mapping the data code to the K resource blocks on a basis of the mapping relationship encoding result.

20. The method according to claim 3, wherein the resource configuration information comprises a preamble code resource position and resource positions of K resource blocks, wherein K is a positive integer, and the method further comprises:

encoding the preamble information to be processed or the preamble part information, to obtain a mapping relationship encoding result, wherein the mapping relationship encoding result comprises K bits, the K bits are in one-to-one correspondence to the K resource blocks, for any one bit, when the bit takes a first value, a resource block corresponding to the bit is identified as carrying a data encoding result, and when the bit takes a second value, the resource block corresponding to the bit is identified as not carrying a data encoding result;

and wherein the sending the preamble code and the data code of the data part information on the basis of the resource configuration information comprises:

sending the preamble code on a basis of the preamble code resource position; and mapping the data code to the K resource blocks on a basis of the mapping relationship encoding result.

* * * * *